(No Model.)

J. H. OSBORNE.
VEHICLE SHAFT IRON.

No. 502,911. Patented Aug. 8, 1893.

Witnesses:
Wm C Cashill
May E. Moore

Inventor
John H. Osborne
by Wm K Moore,
Atty.

UNITED STATES PATENT OFFICE.

JOHN H. OSBORNE, OF UNION CITY, INDIANA.

VEHICLE SHAFT-IRON.

SPECIFICATION forming part of Letters Patent No. 502,911, dated August 8, 1893.

Application filed September 24, 1892. Serial No. 446,799. (No model.)

*To all whom it may concern:*

Be it known that I, JOHN H. OSBORNE, a citizen of the United States, residing at Union City, in the county of Randolph and State of Indiana, have invented certain new and useful Improvements in Vehicle Shaft-Irons; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in vehicle shaft irons, that is to say a device for connecting the ends of the usual cross-bar with thills or shafts, and the object of my invention is the provision of a device of this character which will be of simple and durable construction, which can be easily applied and which securely retain the parts in position and which can be manufactured at a low price, thus producing a device for the intended purpose which will be entirely practical and useful.

To attain the desired objects the invention consists of a casting having lugs for securing it to the thills and arms which form a socket to receive the ends of the cross-bar and securely hold the parts together as will appear from the following description.

Figure 1:
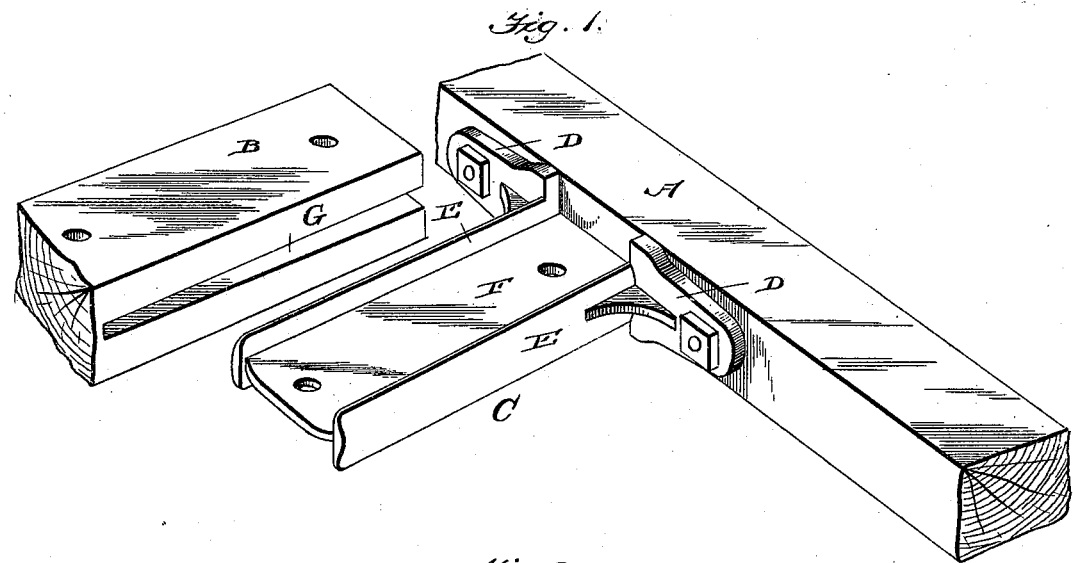
Figure 2:
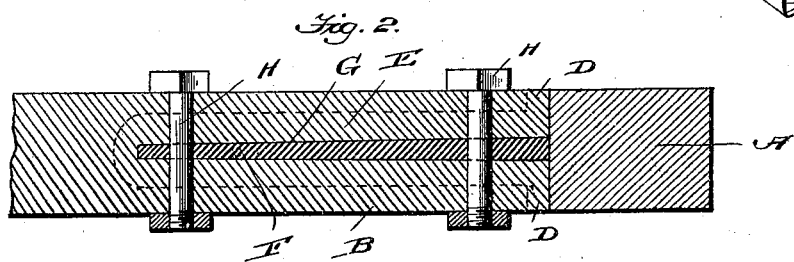
Figure 3:
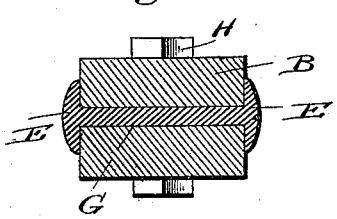

Figure 1 represents a perspective view of a portion of a thill and cross bar with my improvement applied, and the cross bar detached. Figs. 2 and 3 represent sectional views of the iron or casting applied.

In said drawings the letter A designates the thill or shaft and B the usual cross bar connecting the thills and my device C is for connecting the ends of the cross bar with the thills.

The device is made of metal preferably cast and consists of the base having the attaching lugs or ears D, the inward extending arms E and the web or plate F which connects the said arms and the plate extends from the inner faces of the arms about midway of their width and the ends of the cross bar are formed with kerfs, recesses or slots G, which receive the web and the arms thus form a socket to receive the ends of the cross bar and through the cross bar and web pass securing bolts H, and thus it will be seen that the castings or irons securely hold the cross bar to the thills.

It is evident that I provide a simple, durable and cheap device which will hold the cross bar properly and which presents a neat and attractive appearance.

It will be seen that the base of the device is long and provides the two long securing lugs or lips and these are strengthened by the integral webs or flanges which extend from the base to the arms, as clearly shown. It will also be seen that no exterior plates are used in securing the base.

I claim as my invention—

1. In combination with the shafts and the cross-bar having a kerf or slot in each end of the shaft irons secured to the shafts and having a web fitting in said kerfs or slots and bolts passing through the cross-bar and webs to secure the parts together.

2. In combination with the thills and cross bar, the casting having the lugs or ears for attachment to the thills, the arms engaging the sides of the cross bar and the central web arranged in the recesses in the ends of the cross-bar, in the manner described.

In testimony whereof I affix my signature in presence of two witnesses.

JOHN H. OSBORNE.

Witnesses:
L. D. LAMBERT,
WEBSTER LAMBERT.